Dec. 1, 1964 R. E. D. ANDERSON ETAL 3,159,753

GATE CIRCUIT HAVING PHASE SHIFT AND STORAGE MEANS EFFECTING ENERGIZATION DURING A RANGE OF VALUES

Filed June 5, 1962 2 Sheets-Sheet 1

INVENTORS: R.E.D. ANDERSON
J. LA DUCA
BY Roy M. Porter Jr.
ATTORNEY

INVENTORS: R. E. D. ANDERSON
J. LA DUCA
BY Roy M. Porter Jr.
ATTORNEY 3,159,753
GATE CIRCUIT HAVING PHASE SHIFT AND STORAGE MEANS EFFECTING ENERGIZATION DURING A RANGE OF VALUES Robert E. D. Anderson, Florham Park, and Joseph La Duca, Stirling, N.J., assignors to Bell Telephone Laboratories, Incorporated, New York, N.Y., a corporation of New York Filed June 5, 1962, Ser. No. 200,228
8 Claims. (Cl. 307—88.5)

This invention relates to switching apparatus and, more particularly, to a synchronous switch for opening or closing a circuit for supplying alternating-current voltage at a desired point in the voltage cycle.

It is frequently desirable to open or close a circuit comprising a load and a source of alternating current at a desired point in the cycle of the source. For example, this may allow substantial elimination of transients or may allow testing for maximum transients. A switch with its associated control apparatus, commonly called a synchronous switch, is then needed in order to switch at the desired point of the cycle.

Heretofore, synchronous switches have been troubled with lack of accuracy in operation. Many of them have used delay networks in order to provide a range over which the switching point might be varied. This method produces increased phase-angle errors as the frequency of the voltage wave is increased. Other synchronous switches have varied the phase of an auxiliary wave with respect to the phase of the wave of the source in order to obtain the required range of variability. Thus, switching can be arranged to occur at a fixed point on the auxiliary wave. Then phase-angle accuracy does not deteriorate so rapidly with increased frequency. However, heretofore that fixed switching point has been one of the peaks of the auxiliary wave, and has resulted in phase-angle errors in switching at all frequencies. These errors occur because variations of the magnitude of the peak or in the characteristics of the components of the synchonous switch cause switching to occur before or after the exact center of the peak.

It is an object of this invention to improve the accuracy of synchronous switches.

According to the invention, an improved synchronous switch has been devised by producing a wave shifted in phase with respect to the input wave and applying it to a novel gating circuit to connect an alternating-current source to, or disconnect it from, an output at a moment the phase-shifted wave possesses a relatively steep slope.

Phase-angle errors are reduced by switching on a relatively steep slope of the phase-shifted wave, rather than upon the relatively flat peak. Furthermore, that slope increases linearly with the frequency of the input wave so that the unavoidable variation from time to time of wave amplitude or of component characteristics causes no greater phase-angle errors at high frequencies than at low frequencies.

An intermediate magnitude and direction of change of magnitude on this slope of the phase-shifted wave can be selected, in spite of the random timing of the switching command given by the human operator, because the gating circuit is armed the first time that the output of the phase-shifting circuit passes through a predetermined polarity, or range of values, after the switching command. When the phase-shifted wave starts to acquire the other polarity, or range of values, the armed gating circuit generates an output which is turned into a sharp step by conventional amplifying and limiting circuitry. The step then operates the final switching element to connect the source to the output, or to disconnect the source from the output.

According to another feature of the invention, a novel gating circuit has been devised to achieve the gating functions stated above by combining an electrically reactive device and a switching device.

The switching device in the gating circuit has two conditions for passing a signal. It is connected with the input of the gating circuit so that when the input signal satisfies a first one of the conditions the second condition is satisfied only if the electrically reactive device happens to be discharging energy previously stored by virtue of the prior existence of an input signal which did not satisfy the first condition. Thus, the switching device will always start to generate an output at the moment that the input signal first passes from a value not satisfying the first condition to a value satisfying the first condition.

In the preferred embodiment of the invention, this switching device is a transistor. For it, the first condition is that the input signal to the gating circuit be of the right polarity to pass a signal from the input of the gating circuit to the output of the gating circuit through the collector and emitter of the transistor. An output occurs only if, at the same time, the electrically reactive device is discharging energy in a polarity that will cause a current through the emitter-base junction of the transistor.

The use of an energy storage device, such as a capacitor, reduces the number of switching elements needed to perform this type of gating function.

Other objects and features of the invention will become apparent from the following detailed description and the drawings, in which.

Figure 1:
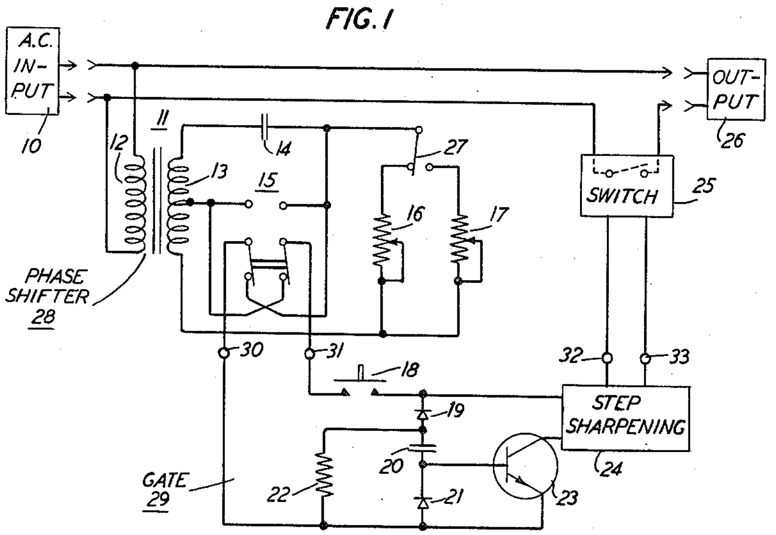
FIG. 1 is a schematic and block diagrammatic illustration of the preferred embodiment of the invention.

In FIG. 1 input 10 is the source of an A.C. voltage wave which is to be supplied to output 26 beginning at a specified point on the voltage wave by closing switch 25. A phase-shifting network 28, including transformer 11, capacitor 14, switch 15, switch 27, and resistors 16 and 17, is connected to input 10. Specifically, the primary 12 of transformer 11 is connected to input 10. One side of capacitor 14 is connected to one side of secondary 13 of transformer 11; and one side each of resistors 16 and 17 is connected to the other side of secondary 13. Single-pole, double-throw switch 27 alternatively connects the other side of capacitor 14 to the other side of resistor 16, or to the other side of resistor 17. The contact terminals of double-pole, double-throw reversing switch 15 are connected between the center tap of secondary winding 13 and the common point between capacitor 14 and switch 27.

The phase-shifting network 28 is connected through terminals 30 and 31 and through command switch 18, which is pressed by the human operator, to a gating circuit 29, including transistor 23, diodes 19 and 21, capacitor 20, resistance 22, and step-sharpening circuit 24. Specifically, one side of switch 18 is connected through terminal 31 to one pole of switch 15. Diode 19, capacitor 20, and diode 21 are connected in series between the other side of switch 18 and the other pole of switch 15 through terminal 30 with diode 19 and diode 21 oriented to conduct in the same direction and with capacitor 20 between them. Capacitor 20 is thus provided with a relatively low resistance charging path which cannot be used for discharge. The base-emitter junction of transistor 23 is connected across and oriented oppositely to diode 21, thereby being protected from excessive reverse voltages; and resistor 22 is connected between the noncommon sides of capacitor 20 and the base-emitter junction of transistor 23 in order to complete a relatively high resistance discharge path for capacitor 20 through the base-emitter junction of transistor 23.

The collector of transistor 23 is connected through the input of step-sharpening circuit 24 to the common point between switch 18 and diode 19. Step-sharpening circuit 24 consists of conventional amplifying circuitry, subject only to the restrictions that it have sufficient limiting to prevent damage to switch 25 and that its input is capable of passing at least a momentary current to the collector of transistor 23.

The output of step-sharpening circuit 24 is connected through terminals 32 and 33 to the input of switch 25, which may consist of one or more relays or purely electrical switching devices, such as PNPN triodes.

The phase-shifting action of phase-shifting circuit 28 is well known, as demonstrated by the explanation on page 30 of "Electronic Circuits and Tubes," Cruft Laboratory, McGraw-Hill, 1947. The voltage across each pair of contacts of reversing switch 15 may be represented as a radius vector of a semicircle in which the voltages across capacitor 14 and resistor 16, for example, are inscribed as the vector legs of a right triangle. The hypotenuse of the right triangle is proportional to the input voltage of source 10. Variation of resistance 16 from zero to (virtual) infinity gives 180° of phase shift. By reversal of reversing switch 15, any relative phase shift may be selected.

The theory of operation of the invention may best be explained by reference to FIG. 2. Assume that it is desired to connect input 10 to output 26 at point P of the voltage wave provided by input 10, as shown in curve 40.

Figure 2:
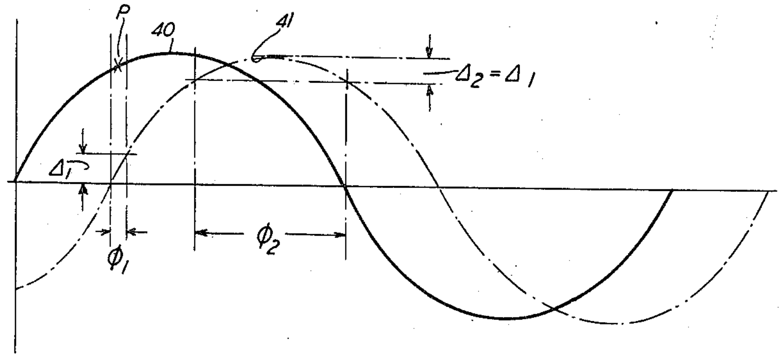
FIG. 2 shows curves which are useful in explaining the theory and operation of the invention.

According to the principal feature of the invention, switching of switch 25 occurs near the steepest part of the phase-shifted wave, as shown by curve 41 of FIG. 2. The phase displacement of point P of curve 40 from the zero phase of curve 41 is attributable to the threshold voltage of transistor 23. It may be observed that a slight variaiton in the amplitudes of the input and phase-shifted waves or in threshold voltage of components of the gating circuitry 29 will produce a variation in the phase of the voltage of input 10 at which switching occurs. For example, assume that the threshold variation covers a range $\Delta_1$, as shown in FIG. 2. The phase angle of the voltage of input 10 at actuation can vary by an incremental amount, $\Phi_1$. Contrast the incremental variation of phase which could occur if the circuit were designed to switch at the peak of the phase-shifted wave. Thus, if threshold variation $\Delta_2$ equals $\Delta_1$, switching may occur at a voltage below the peak of curve 41 by an amount $\Delta_2$. The phase angle of the voltage of input 10 at actuation can vary by an incremental amount, $\Phi_2$. Even if transistor 23 is biased so that the zero axis of FIG. 2 and the effective threshold of gating circuit 29 lies nearer to one peak of phase-shifted wave 41 than to the other, the same relative relationship persists. Similarly, if the amplitude of the phase-shifted wave 41 is increased, it may be observed that switching will occur at an earlier phase angle than previously, if threshold voltage is constant. But, still, the effect will be less pronounced on the slope of the wave than on its peak. Thus, it is obvious by inspection that it is generally true:

$$\Phi_1 < \Phi_2$$

Therefore, phase-angle errors in switching are reduced by the invention.

The detailed action of the novel gating circuit 29 in energizing switch 25 as the phase-shifted wave is passing through its "zero" value in the positive direction will now be explained.

If command switch 18 is pressed at a moment when the voltage across switch 15 is negative at switch 18, transistor 23 produces no collector current because its collector-emitter junction is reverse-biased. However, capacitor 20 will receive some charge through diodes 21 and 19. Before the negative half cycle is complete, current will start to flow from capacitor 20 through the base-emitter junction of transistor 23, and will continue to flow transiently after the negative half cycle is complete. Thus, when the voltage across switch 15 starts to go positive at switch 18, current will flow from switch 18 through the input of step-sharpening circuit 24 and the forward-biased collector-emitter junction of transistor 23. The amplification of step-sharpening circuit 24 is great enough that a sufficient output to drive switch 25 is generated before the voltage across switch 15 advances appreciably farther in the positive direction.

If, on the other hand, switch 18 is pressed at a moment when the voltage across switch 15 is positive at switch 18, transistor 23 can produce no collector current because of the lack of a base-emitter current. Diode 19 will not pass a current to the base-emitter junction of transistor 23, and capacitor 20 presently has no charge. As the voltage across switch 15 goes negative at switch 18, capacitor 20 is charged through diodes 19 and 21. From this point, operation is precisely the same as described in the preceding paragraph. Thus, switch 18 can be pressed quite randomly, and the closing of switch 25 will still occur at point P of curve 40 of FIG. 2.

The circuit of FIG. 1 contains the additional feature that switch 25 may be opened at a point on the waveform of the voltage of input 10 with a phase different from the phase of the point at which it was closed.

Thus, resistor 16 may set the phase shift for closing switch 25 and resistor 17 may set the phase shift for opening switch 25. The operation to be performed is selected by the setting of switch 27. In order to get corresponding action out of switch 25, selector switch 27 may be ganged with a similar selector switch within step-sharpening circuit 24, or within switch 25. Thus, the step issuing from sharpening circuit 24 may be reversed in polarity; or it may be kept with the same polarity and a selection made between two separate switching devices in switch 25. One of those devices would be normally closed and the other normally open. Switch 25 preferably has holding capabilities so that signals from step-sharpening circuit 24 need not continue. Relays are easily given such capabilities, and properly biased PNPN devices inherently possess such capabilities.

Thus, a complete cycle of operation would include pressing switch 18 to close the circuit from input 10 to output 26, then when it is desired to open the circuit, throwing switch 27 to the other side, and pressing button 18 again.

The purpose of step-sharpening circuit 24 is to hit switch 25 suddenly and firmly to reduce any variation in its actuation time from one actuation to the next. A constant delay is easily compensated for by adjustment of the phase shift by varying resistors 16 and 17, and observing the switching angles actually obtained at output 26.

Figure 3:
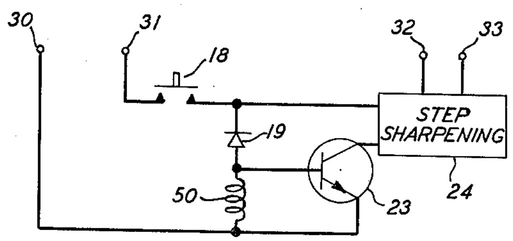
FIG. 3 is a schematic and block diagrammatic variation of gating circuit 29 of FIG. 1.

The variation of gating circuit 29 of FIG. 1 shown in FIG. 3 illustrates that an inductance 50 may be used as an energy storage device instead of the capacitor 20 of FIG. 1. Inductance 50 appears in the place of diode 21 of FIG. 1, capacitor 20 and resistance 22 of FIG. 1 are removed, and the resulting loose side of diode 19 of FIG. 1 is connected directly to the base-emitter junction of transistor 23 and would remain oppositely poled thereto, with respect to terminals 30 and 31. If necessary, various schemes are available to protect the base-emitter junction of transistor 23 from excessive reverse voltage. After switch 18 is closed, current will flow through inductance 50 when the phase-shifted wave from phase shifter 28 of FIG. 1 is negative at switch 18, and energy will be stored in the magnetic field of inductance 50. When the phase-shifted wave from phase shifter 28 starts to go positive at switch 18, inductance 50 will attempt to sustain its current flow and will force some current through the base-emitter junction of transistor 23 before its stored energy is dissipated to the point that its induced voltage falls below the threshold voltage of the base-emitter junction of transistor 23. By this time, the positive voltage at switch 18 has caused collector current of transistor 23 to flow through the input of step sharpening circuit 24. In other respects the operation of the circuit of FIG. 3 is similar to the operation of gating circuit 29 of FIG. 1.

Figure 4:
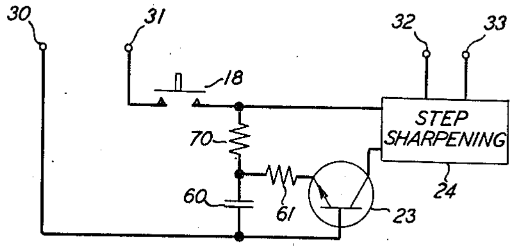
FIG. 4 is another schematic and block diagrammatic variation of gating circuit 29 of FIG. 1.

The variation of gating circuit 29 of FIG. 1 shown in FIG. 4 illustrates that a grounded base configuration of transistor 23 may be used, and that no external diodes are needed if the rectifying properties of both junctions of transistor 23 are used.

Resistor 70 and capacitor 60 are connected across the output of phase shifter 28, that is between switch 18 and terminal 30. One side of resistor 61 is connected to the common point between resistor 70 and capacitor 60, and the other side of resistor 61 is connected to emitter of transistor 23. The base of transistor 23 is connected to the noncommon side of capacitor 60 and the collector of transistor 23 is connected through the input of step sharpening circuit 24 to the noncommon side of resistor 70.

After switch 18 is closed, the base-emitter junction of transistor 23 will be forward biased when the wave applied at terminals 30 and 31 is negative at switch 18; and capacitor 60 will acquire some charge. When the wave starts to become positive at switch 18, capacitor 60 will maintain the forward bias of the emitter-base junction of transistor 23 by discharging stored energy through the emitter-base junction for a sufficiently long period that transistor 23 will draw a collector current through the input of step-sharpening circuit 24.

If switch 18 is closed when the applied wave is positive at switch 18, the firm reverse bias applied to the emitter-base junction of transistor 23 is an extra safeguard against premature switching. The charge on capacitor 60 will be reversed during the negative position of the cycle of the applied wave before the commencement of the next positive portion of the cycle, at which commencement switching is to occur.

Various modifications of the circuit of FIG. 1 would be obvious to one skilled in the art. For instance, if input 10 produces three-phase alternating current, the phase-shifting circuit can be the conventional phase-shifter for three phases, a synchro control transformer with a star or delta-connected primary.

One such transformer can be used to supply the phase shift for closing switch 25 and another the phase shift for opening switch 25.

It is also within the capabilities of one skilled in the art to modify FIG. 4 to use inductance instead of capacitance as the energy storage element, in light of the teaching of the invention. For instance, capacitor 60 may be replaced with resistance and resistance 61 may be replaced with inductance. It further would be obvious how to rearrange the circuits of FIG. 1, FIG. 3, FIG. 4 to use PNP transistors instead of NPN transistors.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A circuit comprising
two input terminals
two output terminals
a first diode and a resistance connected in a first path between said input terminals,
a capacitor and a second diode connected in a second path with said first diode between said input terminals, said second diode being poled in the same direction in said second path as said first diode and said capacitor being between said first and said second diodes,
a transistor having its base-emitter junction parallel with an oppositely poled to said second diode and having its emitter-collector junction connected in a third path between said input terminals through said output terminals and poled oppositely to said first and second diodes with respect to said input terminals.

2. In combination,
a source of an input electrical wave,
an output,
switching means for connecting said source to said output,
and means for actuating said switching means comprising
means for producing a wave shifted in phase with respect to the phase of said input wave
and gating means for producing a switching signal commencing at the instant said shifted wave is passing from a first range of values through an intermediate value to a second range of values, said gating means including
semiconductive switching apparatus having a controlling signal path and a dependent signal path that is enabled by an enabling signal in said controlling signal path,
an energy storage device,
first means for connecting said dependent current path in series relationship with the switching means across the phase-shifting means, said first connecting means and said dependent path together having a first unilaterally conductive portion connected in a first polarity across said phase-shifting means to block said phase-shifted wave from said switching means when said phase-shifted wave has a value within said first range of values and to pass said phase-shifted wave whenever said dependent path is enabled when said phase-shifted wave has a value within said second range of values, and
second means for connecting said controlling signal path and said storage device across said phase-shifting means, said second connecting means and said controlling path together having a second unilaterally conductive portion connected in the opposite polarity across said phase-shifting means to block said phase-shifted wave from said controlling path throughout said second range of values, said second connecting means being arranged to pass energy to said storage device to be stored in response to said wave when said phase-shifted wave has a value within said first range of values, said second connecting means being arranged to pass said stored energy from said storage device through said controlling signal path as said enabling signal when said phase-shifted wave has a value within said second range of values.

3. The combination according to claim 2 in which the controlling signal path is unilaterally conductive and the second unilaterally conductive portion of the second connecting means comprises a blocking diode connected in said opposite polarity serially with said controlling path across the phase-shifting means to block the phase-shifted wave from said controlling path throughout said second range of values, said controlling path being connected in the first polarity across said phase-shifting means.

4. The combination according to claim 3 in which the energy storage device comprises a capacitor connected serially between the controlling signal path and the diode with respect to the phase-shifting means, first resistive means for charging said capacitor, said first resistive means being connected across said controlling path, said second connecting means including second resistive means for discharging said capacitor through said controlling path when said diode is not conducting.

5. The combination according to claim 4 in which the first resistive means comprises a second blocking diode connected serially with the capacitor and the first blocking diode in like polarity as said first diode across the phase-shifting means.

6. A circuit comprising
an input,
an output,
semiconductive apparatus having a controlling signal path and a dependent signal path that is enabled by an enabling signal in said controlling signal path,
an energy storage device,
first means for connecting said dependent current path in series with said output across said input, said first connecting means and said dependent path together having a first unilaterally conductive portion connected in a first polarity across said input to block input signals in a first range from said output and to pass input signals in a second range distinct from said first range whenever said dependent path is enabled when said input signals are in said second range, and
second means for connecting said controlling signal path and said storage device across said input, said second connecting means and said controlling path together having a second unilaterally conductive portion connected in the opposite polarity across said input to block input signals throughout said second range from said controlling signal path, said second connecting means being arranged to pass energy to said storage device to be stored in response to said input signals in said first range, said second connecting means being arranged to pass said stored energy from said storage device through said controlling signal path as said enabling signal when said input signals are in said second range.

7. A circuit according to claim 6 in which the controlling signal path is unilaterally conductive and the second unilaterally conductive portion of the second connecting means comprises a blocking diode connected in said opposite polarity serially with said controlling path across the input to block input signals throughout said second range from said controlling signal path, said controlling path being connected in the first polarity across said input.

8. A circuit according to claim 7 in which the energy storage device comprises a capacitor connected serially between the controlling signal path and the diode with respect to the input, first resistive means for charging said capacitor, said first resistive means being connected across said controlling path, said second connecting means including second resistive means for discharging said capacitor through said controlling path when said diode is not conducting.

References Cited in the file of this patent

UNITED STATES PATENTS

| | | |
|---|---|---|
| 2,942,123 | Schuh | June 21, 1960 |
| 2,977,523 | Cockrell | Mar. 28, 1961 |